(12) United States Patent
Gattari

(10) Patent No.: US 9,651,218 B2
(45) Date of Patent: May 16, 2017

(54) LIGHTING MODULES WITH OPTIMIZED EMISSION

(75) Inventor: Massimo Gattari, Potenza Picena (IT)

(73) Assignee: ENEL SOLE S.R.L., Rome (IT)

( * ) Notice: Subject to any disclaimer, the term of this patent is extended or adjusted under 35 U.S.C. 154(b) by 545 days.

(21) Appl. No.: 13/810,915

(22) PCT Filed: Jul. 23, 2010

(86) PCT No.: PCT/IT2010/000333
§ 371 (c)(1),
(2), (4) Date: Feb. 26, 2013

(87) PCT Pub. No.: WO2012/011136
PCT Pub. Date: Jan. 26, 2012

(65) Prior Publication Data
US 2013/0155677 A1 Jun. 20, 2013

(51) Int. Cl.
F21V 7/00 (2006.01)
F21S 2/00 (2016.01)
F21V 7/04 (2006.01)
F21V 7/22 (2006.01)
F21V 21/30 (2006.01)
F21V 14/02 (2006.01)
F21W 131/103 (2006.01)
F21Y 115/10 (2016.01)

(52) U.S. Cl.
CPC .............. F21V 7/00 (2013.01); F21S 2/005 (2013.01); F21V 7/04 (2013.01); F21V 7/22 (2013.01); F21V 21/30 (2013.01); F21V 14/02 (2013.01); F21W 2131/103 (2013.01); F21Y 2115/10 (2016.08); Y02B 20/72 (2013.01)

(58) Field of Classification Search
CPC ..... F21V 7/00; F21V 7/04; F21V 7/22; F21V 21/30; F21V 14/02; F21V 7/14; F21S 2/005; F21W 2131/103; F21Y 2101/02; Y02B 20/72
USPC .......................................... 362/235
See application file for complete search history.

(56) References Cited

U.S. PATENT DOCUMENTS

| | | | |
|---|---|---|---|
| 2008/0062689 A1* | 3/2008 | Villard ........................ | 362/250 |
| 2009/0103288 A1* | 4/2009 | Boyer et al. ................ | 362/153.1 |
| 2009/0154158 A1* | 6/2009 | Cheng et al. ................ | 362/237 |
| 2010/0157585 A1* | 6/2010 | Diekmann et al. .......... | 362/228 |
| 2010/0277097 A1* | 11/2010 | Maxik .......................... | 315/294 |
| 2011/0164398 A1* | 7/2011 | Holten et al. ................ | 362/84 |

FOREIGN PATENT DOCUMENTS

| | | |
|---|---|---|
| DE | 202008004790 U1 | 7/2008 |
| EP | WO2008/145065 A1 | 12/2008 |
| EP | 2051001 A2 | 4/2009 |
| EP | 2071230 A1 | 6/2009 |

* cited by examiner

Primary Examiner — David V Bruce
(74) Attorney, Agent, or Firm — Robert E. Alderson, Jr.

(57) ABSTRACT

Lighting modules are provided having a reflector which includes a central part and two tilted wings with respect to said central part, and at least two light sources, or light source assemblies, arranged about the ends of said central part. Lighting apparatuses which include such lighting modules are also provided.

18 Claims, 3 Drawing Sheets

LIGHTING MODULES WITH OPTIMIZED EMISSION

CROSS-REFERENCE TO RELATED APPLICATIONS

This application is a National Phase Application of PCT International Application No. PCT/IT2010/000333, International Filing Date, Jul. 23, 2010, which is hereby incorporated by reference in its entirety.

BACKGROUND OF THE INVENTION

Field of the Invention

The present invention relates to the technical field of lighting devices, in particular to the technical field of lighting devices for road illumination.

State of the Art

Lighting assemblies for road applications belonging to the state of the art and commonly available on the market generally comprise: a main body adapted to provide the whole structure with mechanical support and equipped with the appropriate hooking and securing means on poles, cables, spans, chains and walls; a light source (generally with filament or discharge) provided with corresponding mechanical securing and connection and power supply means; a possible reflector adapted to convey the light emission of said light source to a space portion and optics generally comprising a diffuser consisting of a transparent or semi-transparent screen, adapted to close the main body and, possibly, filter the emitted light according to the desired modes.

The road illumination has some peculiarities related to the reflection features of the road surface, which is in general anisotropic. The light reflection occurs according to the angles of light incidence and reflection on the road surface, and therefore, in order to optimize the road lighting and avoid dangerous shadow areas, the light emission is to be directed where it is more effective, i.e. in directions where the luminance result is higher and more uniform.

In essence, the light emission is to be directed to the road surface areas where the ratio of the resulting luminance with the illumination is higher so as to achieve better illumination results using less light emission, and in the areas where the resulting luminance is more uniform, so as to comply with the uniformity requirements set forth in the regulations in force.

In the case of LED lighting assemblies, the overall light emission flow may be directed in a more accurate and exact manner, as each LED may be adjusted in order to conveniently direct the emitted light flow thereof.

In the State-of-the-Art apparatuses, the single LEDs are generally arranged on the same plane and the light is to be diverted in the desired directions so as to obtain the desired overall light beam.

For this purpose, TIR (Total Internal Reflection) lenses, associated with each single LED, are usually employed.

From a point of view, if using single TIR lenses ensures a high level of flexibility, on the other implies a range of technical problems. Firstly, as said TIR lenses are normally made of plastic material, problems related to the natural decay of the material features may occur. In facet, yellowing and matting of the employed plastic materials may occur in a relatively short time and heavily affect the apparatus performance.

Also, using TIR lenses in lighting assemblies for road illumination makes very difficult directing the light emission accurately enough to avoid the lights from being dispersed in the areas close to the area to be illuminate, thus damaging the energy saving of the system. In fact, evaluating and controlling the useful portion of the flow is quite important, which portion is the apparatus flow fraction effectively sent to the area to be illuminated and provides direct information on the amount of light which is sent by the considered lighting apparatus to the concerned area and outside it. The light flow percentage sent to undesired areas is a drop of the energetic performance of the lighting device and therefore, ultimately, a waste of energy to be avoided or, at least, limited.

Lastly, according to the Law of Optics related to the refraction phenomenon, when a light radiation passes from a material to another (as in the passages between air and plastics and then between plastics and air), a decay in intensity and quality of the emitted light beam occurs. Sometimes, in case of white light emission, phenomena of light decomposition into the coloured components may arise, due to refraction.

So as to solve the above-described technical problems, it is therefore apparent the need for lighting apparatuses adapted to optimize their illumination profile without compromising an efficient management of the power dissipated by the employed light sources.

SUMMARY OF THE INVENTION

The present invention concerns a lighting module equipped with at least one reflector and at least three point light sources, or assemblies thereof, conveniently arranged with respect to said reflector, so as to optimize the resulting illumination profile.

The lighting module according to the present invention solves the technical problems previously disclosed by introducing a device which is simple and cost-effective to be implemented, in which the light flow is accurately directed and is not subject to refractions which are to the detriment of its quality and intensity.

DETAILED DESCRIPTION

Figure 1:
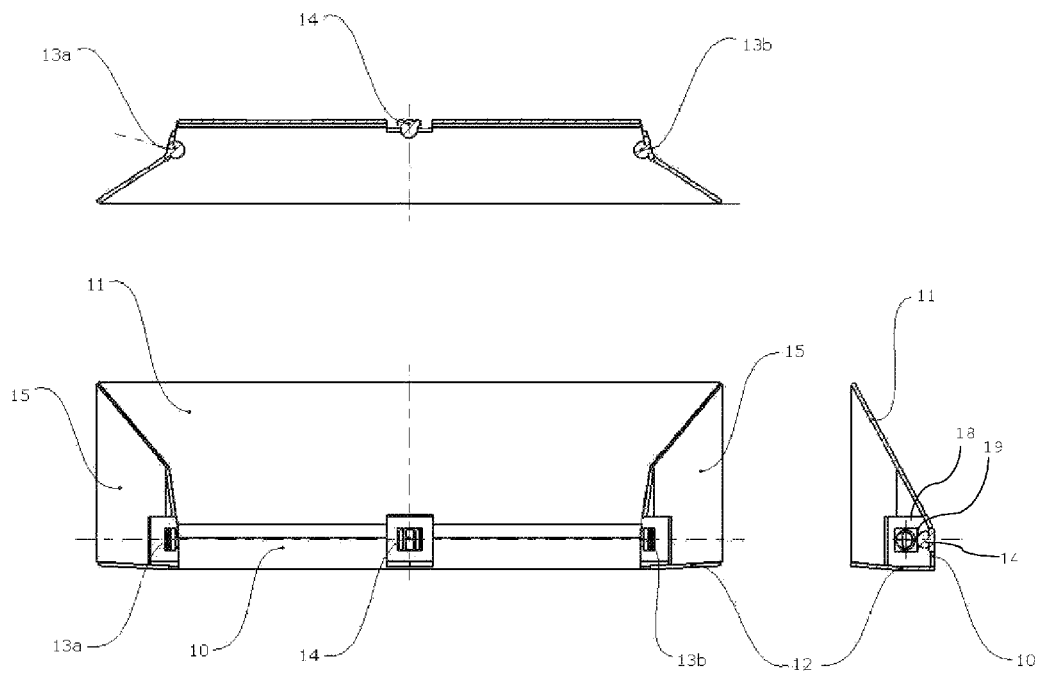
FIG. 1. shows plan, perspective and side-section views of the lighting module according to the present invention.

In a first preferred embodiment of the present invention and with reference to accompanying FIG. 1, the reflector of the lighting module according to the present invention has a reflector comprising a central part 10 and two tilted wings 11, 12 preferably characterized by different dimensions and different inclinations with respect to said central part 10 and preferably joined by two sidewalls 15 opposed to each other; at least two light sources 13a, 13b or light source assemblies 13a, 13b, preferably of the point type, arranged on said central part 10, preferably about its ends.

Said tilted wings 11, 12 may possibly comprise a bend and may comprise several segments possibly characterized by inclinations and/or bends different from one another.

In a second preferred embodiment of the present invention, a third light source 14 is placed on said central part 10, preferably at the middle point thereof.

Said light sources 13a, 13b or light source assemblies 13a, 13b arranged about the ends of said central part 10 are preferably directed at the two fundamental components of the photometric distributions typically employed in the road field.

Figure 2:
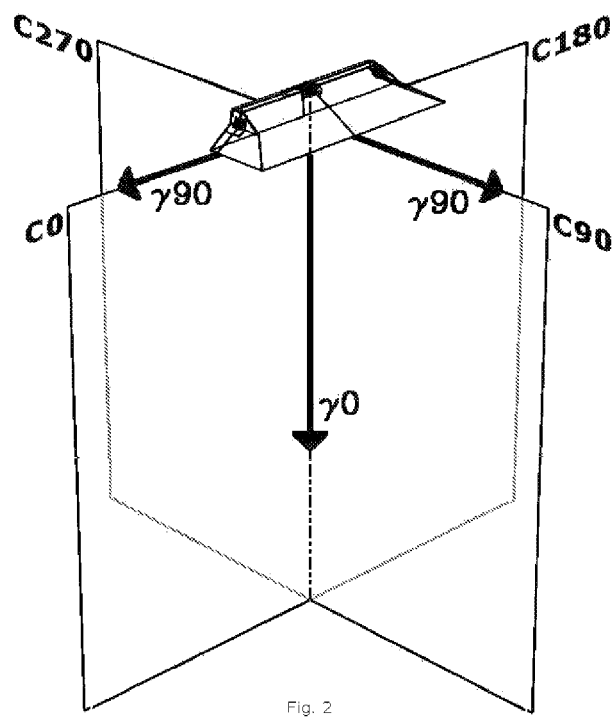
FIG. 2 shows a C/γ coordinate system with reference to the lighting module according to the present invention.

Referring to the reference C/γ coordinate system, commonly used to describe the light emissions in the road illumination field and shown in FIG. 2 in relation to the lighting module according to the present invention, the orientations of said light sources 13a, 13b or light source assemblies 13a, 13b arranged about the ends of said central part 10 are preferably characterized by an angle C between 0° and 30° and by an angle γ between 50° and 90°, and by an angle C between 150° and 180° and by an angle γ also between 50° and 90°. The third light source (14)—or the third light source assembly (14)—arranged at the middle part of said central part 10 is preferably oriented so as to "fill" the light distribution in the middle area left "uncovered" by the other light sources arranged about the ends of said central part 10 with values of the angle C between 0° and 360° and values of the angle γ between 0° and 45°.

This particular arrangement of the point light sources allows the amount of flow hitting the reflector walls to be minimized, thus limiting the number of reflections required to direct the light beam.

The reflector of the device object of the present invention may be advantageously made of plastic material or metal characterized by high light reflection properties, and is preferably made of aluminium. The aluminium allows an efficient dissipation of the heat produced by the light sources during operation, thus contributing to enhance the light emission and duration thereof.

Also, using reflective surfaces removes the phenomena of decomposing the coloured components of the white light which may occur by using lenses made of plastic material.

Said tilted wings 11, 12 are preferably characterized by inclinations of about 30° and 90°, respectively, with respect to said central part 10.

In a preferred embodiment of the present invention, the three light sources 13, 14 or light source assemblies 13, 14 are aligned. The position of the central light source 14 may also be misaligned with respect to the side sources, if a distribution of the different features is required.

In a preferred embodiment of the present invention, the side light sources 13 preferably have an inclination α, in relation to horizontal, between 50° and 90°.

Particularly satisfying results are achieved with light sources inclined of about 75° in relation to horizontal.

The point light sources preferably comprise LEDs having an emission cone of a width between 50° and 150°. Particularly satisfying results are achieved by employing LEDs characterized by emission cones of about 80°.

Said light sources 13a, 13b, 14 or light source assemblies 13a, 13b, 14 preferably comprise suitable orientation means 18, 19 adapted to vary their inclination and/or position. Said orientation means 18 19 comprise, in a preferred embodiment thereof, a support plate 18, for said light sources or said light source assemblies, associated with said reflector by means of suitable coupling means 19 capable of allowing the position and/or orientation thereof to be varied and therefore the orientation of the emitted light beams. For example, said plate 18 may be hinged to said reflector in two locations arranged along its axis. Thereby, said plate 18 and said light sources associated thereto may rotate about the axis of said plate 18, thus modifying the generated light emission profile. Alternatively, said plate 18 can be bound to said reflector by means of coupling means 19 of the spherical type adapted to allow the displacement of the rotation axis.

Alternatively, said plate 18 may be bound to said reflector by means of coupling means 19 allowing the translation in the 3 directions in space. Alternatively, the foregoing orientation systems may be combined with one another.

Moreover, said light sources 13a, 13b, 14 may advantageously comprise suitable means to optimize the emission along preferred directrices. For example, concentrators, reflectors, TIR (Total Internal Reflection) lenses, Fresnel lenses etc. may be advantageously employed.

Finally, said light sources 13a, 13b, 14 may comprise piloting devices adapted to independently control the light emission of said light sources 13a, 13b, 14, thus allowing the overall resulting illumination to be modulated.

A plurality of lighting modules according to the present invention may be employed to form a lighting apparatus being also the object of the present invention.

Figure 3:
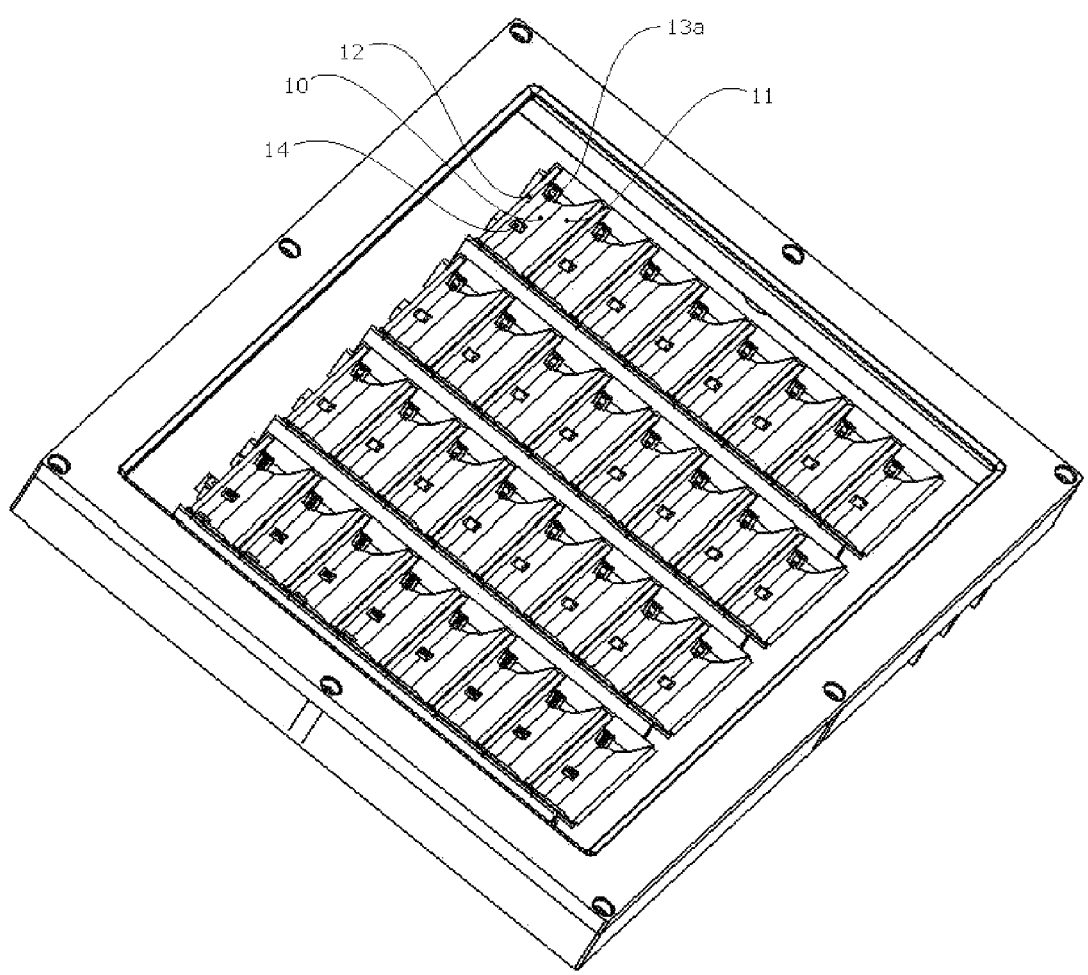
FIG. 3 shows a lighting apparatus according to the present invention comprising a plurality of lighting modules according to a preferred embodiment of the present invention.
Figure 4:
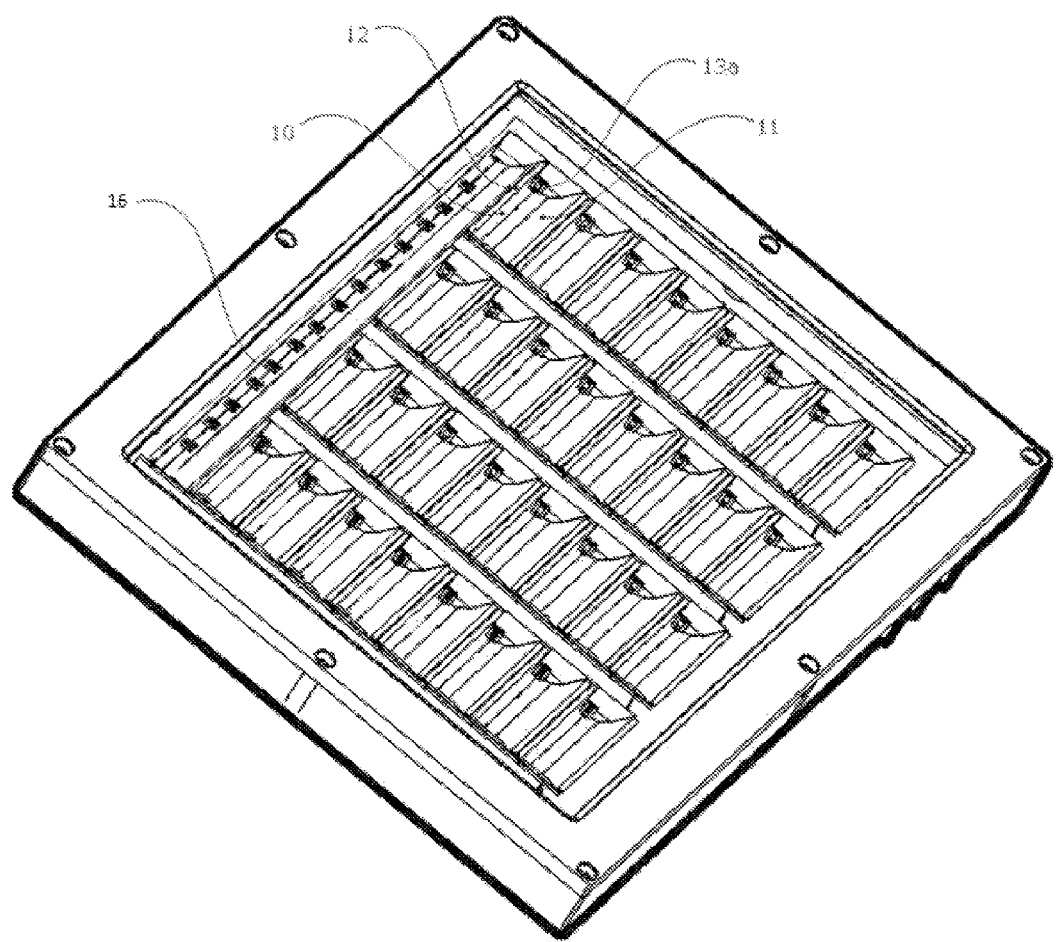
FIG. 4 shows a lighting apparatus according to the present invention, comprising a plurality of lighting modules according to a preferred embodiment of the present invention.

With reference to accompanying FIGS. 3 and 4, said lighting apparatus comprises a plurality of lighting modules according to the present invention, adjacent to one another. This allows to achieve an overall light emission of high intensity, adapted to be advantageously employed in the road illumination field, for example.

With reference to accompanying FIG. 4, said lighting apparatus may advantageously comprise—if employing lighting modules according to the present invention comprising two light sources 13a, 13b—a plurality of point light sources 16 arranged in an array on the side of said lighting apparatus, parallel to said tilted wings 11, 12, preferably on the side of the smaller one.

The invention claimed is:

1. A lighting module comprising a reflector which comprises a central part and two tilted wings with respect to said central part, and at least two light sources, or light source assemblies, arranged about the ends of said central part of the reflector wherein:
   the tilted wings are joined by two sidewalls opposed to each other;
   each of said two light source or light source assemblies project from a respective sidewall of said two sidewalls;
   said two light sources or light source assemblies arranged about the ends of said central part of the reflector face one another and are non-coplanar and oriented, with respect to a reference C/γ coordinate system, at an angle C between about 0° and about 30° at an angle C between about 150° and about 180° respectively, and at an angle γ, in relation to the vertical, between about 50° and about 90°, and
   said reflector is a shared reflector in common with said two light sources or light source assemblies.

2. The lighting module of claim 1, comprising a third light source or light source assembly arranged about the middle point of said central part.

3. The lighting module of claim 2, wherein said third light source, or light source assembly, is oriented according to an angle C between about 0° and about 360° and to an angle γ between about 0° and about 45°.

4. The lighting module of claim 1, wherein said light sources or light source assemblies are aligned.

5. The lighting module of claim 1, wherein said light sources comprise LEDs.

6. The lighting module of 5, wherein said LEDs are characterized by an emission cone having a width between about 50° and about 150°.

7. The lighting module of claim 1, wherein said light sources or light source assemblies are independently controlled for controlling the light emission of said light sources or light source assemblies, thus allowing the overall resulting illumination to be modulated.

8. The lighting module of claim 1, wherein said light sources or light source assemblies comprise an orientation component adapted to vary the inclination thereof.

9. The lighting module of claim 8, wherein said orientation component comprises a supporting plate for said light sources or said light source assemblies, associated with said reflector and a coupling component capable of allowing variation of the orientation thereof and therefore the orientation of the emitted light beam.

10. The lighting module of claim 1, wherein said tilted wings comprise a bend.

11. The lighting module of claim 1, wherein said tilted wings comprise more than one segment.

12. The lighting module of claim 11, wherein said more than one segment comprises inclinations or bends different from one another.

13. The lighting module of claim 1, wherein said tilted wings of said reflector comprise inclinations of about 30° and about 90°, respectively, with respect to said central part.

14. The lighting module of claim 1, wherein said reflector comprises plastic material or metal.

15. The lighting module of claim 1, wherein said reflector comprises aluminium.

16. A lighting apparatus comprising a plurality of lighting modules which are positioned adjacent to one another, each lighting module comprising a reflector which comprises a central part and two tilted wings with respect to said central part, and at least two light sources, or light source assemblies, arranged about the ends of said central part of the reflector wherein:

the tilted wings are joined by two sidewalls opposed to each other;

each of said two light source or light source assemblies project from a respective sidewall of said two sidewalls;

said two light sources or light source assemblies arranged about the ends of said central part of the reflector face one another and are non-coplanar and oriented, with respect to a reference C/γ coordinate system, at an angle C between about 0° and about 30° and at an angle C between about 150° and about 180° respectively, and at an angle γ, in relation to the vertical, between about 50° and about 90°, and said reflector is a shared reflector in common with said two light sources or light source assemblies.

17. The lighting apparatus of claim 16, further comprising a plurality of point light sources arranged in an array on the side of said lighting apparatus parallel to said tilted wings.

18. The lighting apparatus of claim 17, wherein said plurality of point light sources arranged in an array are arranged on the side corresponding to the smaller wing of said tilted wings.

* * * * *